United States Patent [19]

Sleeth et al.

[11] 4,315,948

[45] Feb. 16, 1982

[54] PROCESS FOR PREPARING COOKED BACON HAVING REDUCED LEVELS OF N-NITROSAMINES

[75] Inventors: Rhule B. Sleeth, Paradise Valley; Richard F. Theiler; Robert B. Rendek, both of Scottsdale, all of Ariz.

[73] Assignee: Armour and Company, Phoenix, Ariz.

[21] Appl. No.: 158,679

[22] Filed: Jun. 12, 1980

[51] Int. Cl.³ .............................................. A23B 4/00
[52] U.S. Cl. .................................... 426/266; 426/281; 426/332; 426/641; 426/652
[58] Field of Search ............... 426/264, 265, 266, 332, 426/335, 641, 646, 652, 281, 533, 650

[56] References Cited

U.S. PATENT DOCUMENTS

| | | | |
|---|---|---|---|
| 2,974,047 | 3/1961 | Holmes | 426/264 |
| 3,868,468 | 2/1975 | Tompkin et al. | 426/266 X |
| 4,112,133 | 9/1918 | Rao et al. | 426/652 X |

FOREIGN PATENT DOCUMENTS 549657 12/1957 Canada ............................. 426/266

OTHER PUBLICATIONS

Red Arrow Products Technical Directory, pp. 1–32.
Gorbator et al., "Liquid Smoke for use in Cured Meats", Food Technology, vol. 25, (1971), pp. 71–77.
Booth et al., "A New Approach to Wood Smoke Flavoring", Food Trade Review, 6-1971, pp. 25, 26 & 32.
Knowles et al., "Nitrosation of Phenols in Smoked Bacon", Nature, vol. 24, 6-1974, pp. 672–673.
Knowles et al. (I), J. Sci. Fd. Agric., 1975, 26, pp. 189–196.
Knowles et al. (II), J. Sci. Fd. Agric., 1975, 26, pp. 267–276.
Davies et al., "Catalytic Effect of Nitrosophenols on N-Nitrosamine Formation", Nature, vol. 266, 1977, pp. 657–658.

Primary Examiner—Arthur L. Corbin
Attorney, Agent, or Firm—Frank T. Barber

[57] ABSTRACT

This invention relates to a process for preparing bacon and, more particularly, to a process for preparing bacon which, when cooked, will have reduced levels of N-nitrosamines by injecting green bacon bellies with a curing solution composed of a nitrite-containing pickle, a liquid smoke and a food grade emulsifier.

8 Claims, No Drawings

PROCESS FOR PREPARING COOKED BACON HAVING REDUCED LEVELS OF N-NITROSAMINES

BACKGROUND OF THE INVENTION

For many years it has been common practice to prepare cured bacon by treating green (uncured) bellies with a curing solution (hereinafter "pickle") and then smoking the cured bacon to impart a desirable flavor. A major component of the pickle is sodium nitrite which inhibits the germination of Clostridium botulinum spores, thus ensuring that the cured bacon will be free of the deadly toxin produced by this bacterium. In recent years, however, much controversy has surrounded the use of sodium nitrite because there have been allegations that residual nitrite from the pickle can react with organic amines present in various cured pork products to form carcinogenic nitrosamines. This problem is accentuated with bacon because nitrosamine formation is induced by the elevated temperatures encountered when the bacon is cooked for consumption; i.e., those exceeding 300° F.

Many approaches have been considered in seeking a remedy to this problem and proposed remedies have included eliminating nitrite from the pickle or reducing residual nitrite levels in the cured product. Neither of these approaches is particularly satisfactory, however, because there is presently no suitable substitute for nitrite, and because reducing nitrite levels could increase the likelihood that C. botulinum spores would grow in the cured bacon.

Conventional pickle also contains a number of ingredients in addition to sodium nitrite. These include buffering agents such as sodium tripolyphosphate to stabilize the nitrite, agents to facilitate curing such as sodium erythorbate or ascorbic acid, and sodium chloride. In certain instances the buffer can be particularly useful because sodium nitrite is unstable in the presence of acid. For example, a pickle having a pH of 6.7 will show essentially no depletion of nitrite after 24 hours whereas pickle having a pH of 5.9 can show a 60% decrease in nitrite after 24 hours. The advantages and disadvantages of using buffers in pickles containing nitrite are well documented in the art.

Cured bacon has typically been prepared by immersing whole green bellies in pickle or by injecting the pickle directly into the green bellies. Commercial procedures most commonly involve injection of the bellies because the curing process can be rapidly and efficiently completed. When cured in this way, a quantity of pickle usually constituting 8-15% of the weight of the meat is injected; thus, for example, if a 7-kilogram bacon belly were pumped (i.e., injected) with pickle at the level of 10%, a quantity of 700 grams of pickle would be used.

Traditionally, cured bellies were smoked by exposing them to direct smoke in a smokehouse; however, the direct smoking of meat has a number of disadvantages and recent years have seen the development of a variety of liquid smoke compositions which are now in wide use. A number of U.S. patents disclose procedures for preparing and applying such products. For example, in U.S. Pat. No. 3,106,473, C. M. Hollenbeck describes a process for preparing an aqueous liquid smoke by counter current extraction of wood smoke; in U.S. Pat. No. 3,445,248, K. Miler et al. describe a method for preparing a refined liquid smoke extract suitable for use in sausage; in U.S. Pat. No. 3,480,446, C. M. Hollenbeck describes a method for preparing a smoke-flavored edible oil by extracting an aqueous smoke solution with oil; and in U.S. Pat. No. 3,523,802, R. H. Wandel et al. describe a process for preparing an aqueous liquid smoke particularly applicable to superficially treat hot dogs and smokey links, the liquid smoke being prepared by treating an aqueous smoke solution with a non-toxic oxidizing agent in order to destroy certain color-forming constituents of the smoke.

The basic compositions of several liquid smokes have been extensively investigated and it is reported that they contain three basic classes of components: acids, phenols and carbonyl compounds, all of which contribute to the flavor and color characteristics of smoked products. The phenols, which are acidic in nature, and the acids account for the low pH of liquid smoke, which is generally on the order of 2 to 3. Furthermore, the phenols contribute greatly to the smokey flavor imparted by the liquid smokes. The carbonyl compounds, which are more neutral, constitute a major portion of the color-forming components. These components give the meat surface a desirable brownish smoke color when the liquid smoke is applied by spraying or atomization.

Liquid smokes have found wide commercial acceptance. Those used most often are generally either aqueous or non-aqueous (oil based) solutions, although powdered forms of liquid smokes are also available. Examples of such smokes are CharSol which is an aqueous solution of hardwood smoke that has been processed to remove particulate matter; CharOil which is a vegetable oil extract of CharSol; and CharDex, which is a malto-dextrin that has been treated with CharSol and spray dried. These products are produced by Red Arrow Products Company. CharSol and CharOil are primarily used for surface applications to pork products and for direct addition to sausage products, whereas CharDex is primarily useful for addition to meat products that cannot tolerate added moisture, such as certain sausage products.

The technical literature distributed by Red Arrow indicates that CharSol and CharDex may be added to curing solutions which do not contain nitrite and that the resulting solutions can be pumped without difficulty. However such liquid smokes have not been successfully added to curing solutions containing nitrite and pumped on a commercial basis. There are a number of reasons for this, many of which are associated with the physical character of such compositions.

Liquid smoke is acidic in nature and the nitrite in the pickle is acid sensitive. Accordingly, if liquid smoke is added to the pickle, it is necessary to buffer the pickle with compounds such as sodium tripolyphosphate in order to avoid the liberation of nitric oxides. Although buffering can overcome that problem, it raises the pH so that certain components of the liquid smoke, particularly, the phenolic compounds, tend to separate from the aqueous phase. Such precipitated matter tends to cause plugging of the injection needles and the non-homogeneous nature of the mixture makes it is virtually impossible to uniformly inject the bellies.

In addition, there is also another reason for excluding liquid smokes from the pickle. Liquid smokes contain significant levels of phenols and there have been recent suggestions in the scientific literature that phenols will enhance the rate at which organic amines are nitrosated. For example, R. Davies and D. J. McWeeny in Nature 226, 657 (1977) stated "It therefore seems that at suitable concentrations the presence of phenols can lead to an enhancement of the rate of nitrosamine formation". Thus, the addition of liquid smoke to the curing pickle might be expected to increase N-nitrosamine levels. This factor, in combination with the other disadvantages noted above made it clear at the time the present invention was made that the problems associated with incorporating liquid smoke into pickle containing nitrite outweighed any advantage that might be derived.

We have discovered a method whereby the foregoing problems are overcome and green bellies can be pumped with a specially modified pickle containing liquid smoke. Moreover, we have discovered, to our surprise, that the resulting bacon contains reduced levels of N-nitrosamines, while at the same time the levels of residual nitrite present in the uncooked cured product remain relatively unaffected, thus ensuring that the germination of C. botulinum spores will be prevented. In addition, the flavor of the product when cooked for consumption is remarkably improved.

Accordingly, one object of the present invention is to provide a process to prepare a cured bacon product which will be safe from contamination by deadly C. botulinum toxins.

A second object of the present invention is to provide a process for preparing cured bacon which, when cooked for consumption, will contain relatively low levels of the N-nitrosamines which are alleged to be carcinogens.

Still another object of the present invention is to prepare cured, smoked bacon which, while meeting the aforementioned objectives, will have enhanced flavor characteristics and thus will be more acceptable to consumers when cooked for consumption.

These and other objects of the invention will become apparent from the detailed descriptions of preferred embodiments which follow.

DETAILED DESCRIPTION OF PREFERRED EMBODIMENTS

The present invention concerns our discovery that cured bacon, which will have substantially reduced levels of N-nitrosamines when cooked, can be prepared by injecting whole green bellies with a nitrite-stable curing solution comprising nitrite-containing pickle, liquid smoke in concentration to provide 20 to 160 ppm phenolic constituents and 10 to 800 ppm carbonyl compounds based on the weight of the green bellies, and an effective amount of a food grade emulsifier which does not substantially increase N-nitrosamine formation. The ratio of carbonyl compounds to phenolic constituents in the liquid smoke must be within the range of 0.5–5 to 1. Following injection, the bellies are processed to effect curing. It must be emphasized that injection of the liquid smoke is a requirement of the present invention, for if bellies are exposed only to external liquid smoke, the smoke remains on the surface of the meat and does not disperse throughout the meat matrix. As a result, there is substantially no reduction of N-nitrosamines when the bacon is cooked for consumption.

Because the liquid smoke and pickle combination is to be injected, it is necessary to use a liquid smoke which has relatively reduced levels of the color-forming constituents that can stain the bacon, and the pickle/smoke combination must preferably be an essentially uniform solution. An appropriate solution may be prepared using Aro-Smoke, a product recently introduced by Red Arrow Products Company or, alternatively, the following procedure may be employed. An aqueous solution of wood smoke is prepared and refined by means well known in the art or, if so desired, a commercial aqueous wood smoke, such as Red Arrow's Char-Sol C-10, may be used as the starting solution. The pH of the solution is adjusted to ca 10–11 with an appropriate base, such as sodium hydroxide, and the mixture is extracted with diethyl ether to remove certain of the carbonyl containing compounds. The aqueous solution is reacidified to a pH of ca 2–3 with an appropriate acid, such as hydrochloric acid, and the mixture is extracted with diethyl ether. After evaporation of the ether, a water-insoluble extract is obtained for which the ratio of carbonyl-containing compounds to phenolic constituents is in the range of 0.5–5 to 1. Preferably, this ratio will be in the range of 0.75–3 to 1 to obtain adequate suppression of N-nitrosamines and superior flavor characteristics when the bacon is cooked for consumption.

Because the extract is water insoluble, a food grade emulsifier is required to obtain an injectable, preferably one-phase, mixture of the extract in pickle. A wide range of suitable emulsifiers is available and the effective amount of emulsifier required will depend on the characteristics displayed by each individual emulsifier. Polysorbate emulsifiers are generally satisfactory to practice the present invention and polysorbate 80 is particularly preferred when not less than 0.2% of emulsifier is used, based on the weight of the pickle solution. Certain other emulsifiers which provide suitable emulsification may also exhibit other characteristics which make them less desirable to use. Lecithin, for example, has been shown to increase N-nitrosopyrrolidine formation. Therefore, in view of the result which is to be achieved by utilizing the process of the present invention, emulsifiers which exhibit this tendency should be avoided.

As noted above, conventional pickle contains water and a number of other ingredients such as sodium nitrite, sodium tripolyphosphate, sodium erythorbate and sodium chloride which are useful to cure the meat and to provide desirable flavor characteristics. A number of pickle compositions were used in developing the present invention. One such pickle comprised an aqueous solution of 2% sodium tripolyphosphate, 15% sodium chloride, 0.12% sodium nitrite and 0.6% sodium erythorbate monohydrate; however, these proportions and ingredients are not critical to the operability of the present invention and it is anticipated that the desired reduction of N-nitrosamines will be obtained when any conventional, stable nitrite-containing pickle is used in combination with a liquid smoke.

The amount of the unique smoke flavoring/emulsifier mixture which is added to the pickle can vary depending on a number of factors, including the amount of pickle to be pumped into the green belly and the amount of smoke flavor which is desired for the cooked bacon. However, we have found that when a mixture of emulsifier and liquid smoke having a carbonyl/phenol ratio of 0.5–5 to 1 is added to pickle, and a quantity of pickle is pumped in concentration to provide 20–160 ppm of phenols and 10 to 800 ppm of carbonyl compounds based on the weight of the green belly, N-nitrosamine levels in the bacon, when cooked for consumption, will be reduced and the bacon will have superior flavor characteristics. Preferably, the concentration range for the phenols will be 40–120 ppm and the concentration range for the carbonyls will be 30–360 ppm.

When adding the smoke flavoring/emulsifier mixture to the pickle, the character of the pickle must also be considered. If the pickle is buffered, the somewhat acidic liquid smoke/emulsifier mixture can be added to the pickle without adversely affecting nitrite levels. However, if the pickle is unbuffered, this mixture should be preneutralized with a suitable base so that, when the mixture is added to the unbuffered pickle, nitrite levels are not depleted.

The result obtained according to the present invention cannot be satisfactorily obtained using conventional liquid smokes. Addition of acidic aqueous liquid smokes to pickle causes a rapid reduction in nitrite levels unless the pickle is buffered, and the buffer itself can have a detrimental affect on conventional liquid smoke because it can induce formation of an insoluble precipitate which could plug the injection needles. Furthermore, the high carbonyl compound content of conventional liquid smokes would tend to cause staining of the bacon, as previously mentioned. If the liquid smokes are pre-neutralized to avoid the aforementioned problems, a resinous precipitate forms which also causes needle-plugging problems, and the resulting mixture has undesirably reduced levels of phenols and carbonyls.

Oil-based liquid smokes are also unsatisfactory because the concentrations of the phenols and carbonyl compounds are substantially lower than those for the aqueous liquid smokes; thus, proportionally more of the oil-based smoke would be required. This concentration factor in combination with the fact that the oil is immiscible with pickle compounds the problems associated with the formation of an injectable liquid smoke solution and makes the use of oil-based liquid smokes clearly undesirable.

To evaluate the improvement demonstrated by the present invention, bellies were exposed to a variety of liquid smokes, including liquid smoke prepared according to the procedure described above, Aro-Smoke (which has properties comparable to liquid smoke prepared according to the above procedure) and several commercial liquid smokes. The following examples are illustrative.

EXAMPLE 1

A 200 ml quantity of CharSol C-10 was treated according to the procedure set forth above to give 8.4 g of oily extract. A 29% solution of the extract in polysorbate 80 was prepared and the phenolic and carbonyl compound constituents of this smoke (hereinafter "Prepared Smoke") were assayed spectrophotometrically using 2,6-dimethoxyphenol and 2-butanone as the standards, respectively. From the assay results the carbonyl/phenol ratio was determined. Similar assay and ratio calculations were also made for Aro-Smoke (which contained ca 80% polysorbate), CharSol C-10, and Royal Smoke, another commercial aqueous liquid smoke from Griffith Laboratories. The following results were obtained.

| Sample | Phenols (mg/ml) | Carbonyls (mg/ml) | Ratio Carbonyls:Phenols |
|---|---|---|---|
| Prepared Smoke | 35 | 54 | 1.5:1 |
| Aro-Smoke | 39 | 54 | 1.4:1 |
| Royal Smoke | 7.5 | 79 | 10.5:1 |
| CharSol C-10 | 14 | 99 | 7.1:1 |

EXAMPLE 2

The following test results demonstrate that pumping of the liquid smoke is required to attain reduction of the N-nitrosamines. Two curing pickles were prepared having the following compositions:

| | Percentage in Pickle | |
|---|---|---|
| Ingredient | Control | Control + Aro-Smoke |
| Water | 85.64 | 83.72 |
| Sodium Chloride | 12.50 | 12.50 |
| Sodium Tripolyphosphate | 1.25 | 1.25 |
| Sodium Erythorbate Monohydrate | 0.50 | 0.50 |
| Sodium Nitrite | 0.10 | 0.10 |
| Veralock | 0.01 | 0.01 |
| Aro-Smoke | — | 1.92 |

Forty-eight green skin-on bacon bellies were obtained, divided into four groups of 12 and skinned prior to processing. All groups were pumped at levels of 13% based on the weight of the bellies. Groups A and B were pumped with Control pickle, and Groups C and D were pumped with Control plus Aro-Smoke; therefore, following the pumping step, each belly in Groups C and D contained 100 ppm of phenols and 140 ppm of carbonyls, whereas those in Groups A and B contained none. The bellies in each group were heat processed under identical conditions to cure the bacon and the bellies in Groups B and C were also externally smoked with atomized CharSol C-10 at ca five times the amount of liquid smoke normally employed in commercially produced bacon. The bellies were then chilled and two days later approximately 1-pound center drafts containing ca 17–18 slices per draft were taken from each belly.

Five days after slicing, bacon samples from each group were fried at 340° F. for three minutes per side, and the fried bacon was analyzed for N-nitrosamine content using N-nitrosopyrrolidine as the standard. The following results were obtained.

| Group | N-Nitroso-pyrrolidine (ppb)* | % Reduction of N-Nitrosopyrralidine Compared to Group A |
|---|---|---|
| A. Control pickle, no external smoke | 14 ± 5 | — |
| B. Control pickle and external smoke | 16 ± 3 | — |
| C. Control pickle plus Aro-Smoke and external smoke | 6 ± 1 | 63 |
| D. Control pickle plus Aro-Smoke, no external smoke | 6 ± 3 | 57 |

*Data represents the mean ± the standard deviation from N = 6 different determination.

These results clearly show that internal application of the smoke is required to achieve the desired reduction of N-nitrosamines.

EXAMPLE 3

Three curing pickles were prepared with the following compositions:

|  | Percentage in Pickle | | |
|---|---|---|---|
| Ingredient | Control | Control + Liquid Smoke (I) | Control + Liquid Smoke (II) |
| Water | 87.48 | 86.71 | 85.94 |
| Sodium Chloride | 11.54 | 11.54 | 11.54 |
| Sodium Tripolyphosphate | 0.48 | 0.48 | 0.48 |
| Sodium Erythorbate Monohydrate | 0.42 | 0.42 | 0.42 |
| Sodium Nitrite | 0.08 | 0.08 | 0.08 |
| Aro-Smoke | — | 0.77 | 1.54 |

Fresh skin-on bellies were selected and each belly was pumped with one of the above pickle solutions at a level of 13% based on the weight of the meat; therefore, following pumping, the levels of phenolic compounds in the bellies were 40 and 56 ppm for formulations I and II, respectively, whereas the levels of carbonyl compounds were 80 and 112 ppm, respectively. The bellies were processed in a smokehouse according to a USDA approved procedure to effect curing and the resulting bacon was analyzed five times for nitrite content. In addition, after frying the bacon according to the procedure described in Example 2, the fried bacon was analyzed twelve times for N-nitrosopyrrolidine content, with the following results:

| Formula | Residual Nitrite (ppm)* | N-Nitroso-pyrrolidine (ppb)** | % Reduction of N-Nitrosopyrrolidine Compared to Control |
|---|---|---|---|
| Control | 31 ± 5.3 | 18.0 ± 6.2 | — |
| Control + Aro-Smoke (I) | 32 ± 8.4 | 11.9 ± 4.8 | 34 |
| Control + Aro-Smoke (II) | 24 ± 4.3 | 6.3 ± 2.4 | 65 |

*Data represents the mean ± the standard deviation from N = 5 different determination.
**Data represents the mean ± the standard deviation from N = 12 different determination These results show that the N-nitrosamine levels in the cured, fried bacon which had been injected with liquid smoke according to the present invention were markedly lower than the levels found for the control and, furthermore, residual nitrite was not significantly reduced.

The bacon samples were further tested in consumer studies conducted with randomly selected bacon users. The test protocol involved a hedonic scoring system in which 1=disliked extremely and 9=liked extremely to evaluate flavor and overall acceptability. The results which follow show statistically significant differences ($p \leq 0.05$) between the control and the smoked products in both categories.

| Formula | Test Scores | |
|---|---|---|
|  | Flavor | Overall Acceptability |
| Control | 6.16 | 6.11 |
| Control + Aro-Smoke (I) | 7.15 | 7.20 |
| Control + Aro-Smoke (II) | 7.07 | 7.22 |

Our invention is not restricted solely to the description provided above, but encompasses all applications envisaged by the following claims.

We claim:

1. A process for preparing cured bacon which, when cooked for consumption, contains substantially reduced levels of N-nitrosamines, said process comprising the steps of
   preparing a nitrite-stable injectable curing solution comprising
      a nitrite-containing pickle,
      a liquid smoke in concentration to provide 20 to 160 ppm phenols and 10 to 800 ppm carbonyl compounds, based upon the green weight of the belly to be injected, the ratio of carbonyls to phenols being within the range of 0.5-5 to 1, and
      an effective amount of a food grade emulsifier which does not substantially increase N-nitrosamine formation;
   injecting said curing solution into a green belly; and
   processing said belly to effect curing.

2. The invention as disclosed in claim 1 wherein said pickle is buffered to stabilize the nitrite.

3. The invention as disclosed in claim 2 wherein said pickle is buffered with sodium tripolyphosphate.

4. The invention as disclosed in claim 1 wherein said pickle is unbuffered and said liquid smoke is preneutralized to avoid nitrite depletion in the unbuffered pickle.

5. The invention as disclosed in claim 1 wherein the ratio of carbonyl to phenolic compounds is within the range of 0.75-3 to 1.

6. The invention as disclosed in claim 5 wherein said liquid smoke is in concentration to provide 40-120 ppm of phenols and 30-360 ppm of carbonyls based on the green weight of the belly.

7. The invention as disclosed in claim 6 wherein said food grade emulsifier is a polysorbate emulsifier.

8. The invention as disclosed in claim 6 wherein said food grade emulsifier is polysorbate 80.

* * * * *